Patented Jan. 11, 1927.

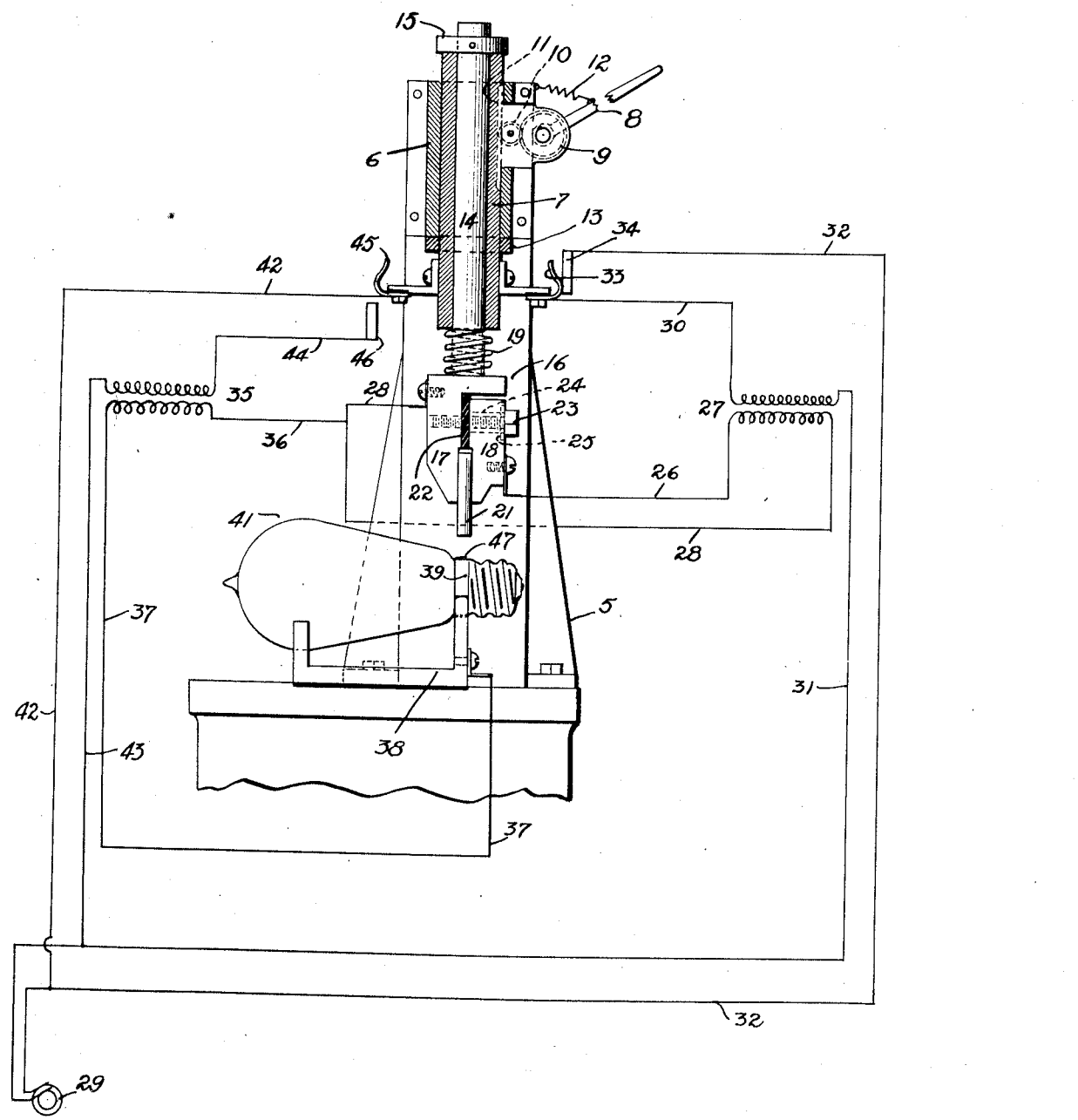

1,613,957

UNITED STATES PATENT OFFICE.

HARRY DE FOREST MADDEN, OF NEWARK, NEW JERSEY, ASSIGNOR TO WESTINGHOUSE LAMP COMPANY, A CORPORATION OF PENNSYLVANIA.

METHOD AND MACHINE FOR ELECTRIC WELDING.

Application filed January 19, 1923. Serial No. 613,677.

The invention relates to the welding of coated metals and more particularly to a method and apparatus for welding a lead-in wire of an incandescent electric lamp to the base thereof.

An object of the present invention is to provide a method of welding a coated leading-in wire to the base of a lamp.

Another object is to provide a method whereby the coating of a treated wire may be rendered conductive and a subsequent welding operation performed.

Another object is to heat treat a coated wire and subsequently pass an electric current therethrough to perform a welding operation.

A further object is to provide a means for electrically heating a coated wire to render the coating non-resistant and for causing an electric current to pass therethrough.

Other objects and advantages will be apparent as the description proceeds.

The manufacture of incandescent electric lamps includes the operation of securing the two leading-in wires or conductors with external contacts such as comprise the metallic base or screw plug of the lamp. One of the leading-in wires is usually secured to a contact member insulated from the shell of the base. The other wire is connected to the external surface of the cylindrical portion of the base, this latter connection being the one to which the present invention relates.

Heretofore, the connection between the base and a leading-in wire was accomplished by a soldering operation, whereas the present invention aims to produce an effective connection between these parts by an electric welding operation.

Considerable difficulty has, however, arisen in attaining a practical method for performing the welding operation, owing to the resistance offered by a coating previously applied to the wire for the purpose of improving the seal between the wire and the glass portion of the lamp.

It is the practice in the lamp industry to coat or treat the leading-in conductors to obtain an efficient wetting of the wire with the glass portion or what is termed the press of the lamp in which the wires are embedded. One such treatment which is extensively used, consists in heating the wire and passing it through a borax solution to obtain a deposit of the borax upon the wire which is then baked, the wire becoming sheathed in a film which subsequently acts as an insulator and opposes the welding operation by preventing the free passage of an electrical current transversely through the wire.

Heretofore, when attempts were made to weld this treated wire to a lamp body, a comparatively high voltage was necessary to break down the coating on the wire and the relatively fine wire, as well as the thin wall of the base, received an excessive amount of heat, resulting in the destruction of the wire or of the wall at the point of welding. In many cases, a hole was burned through the wall of the base or it was sufficiently weakened to result in an ineffective and impractical union.

The present method overcomes the above disadvantages and provides for an initial application of heat to a wire at the point of welding to another body to render the coating non-resistant to an electrical current and in subsequently passing a current through the bodies to weld them together.

An apparatus for practicing the present method may comprise a heating element suitably disposed in cooperation with a welding device. The heater may consist of a body brought to a required temperature by means of a flame or a body which may be disposed in a coil and heated electrically by inductance.

A preferable mode of practicing the present invention is to provide a heating element comprising a resistance body, such as a rod of carbon, tungsten, or the like, and to pass a current therethrough to permit the resistant property of the element to generate the proper degree of heat therein. The heating element may be moved in contact with a wire positioned for welding in order to heat treat and render the coating non-resistant, after which suitable cooperating mechanism may be utilized to cause a welding operation by permitting a flow of electrical current through the bodies to be welded. The heating element may serve to impart heat to a body to be welded and as a terminal or electrode to carry a welding current.

The invention will be more fully understood by reference to the following description and the accompanying drawing which shows an elevational view, partly in section, of a device for performing a welding operation and the electrical connections in a more or less diagrammatic manner.

An embodiment of the invention may comprise a device including an upright or standard 5 having a vertical guide 6 secured to the upper end thereof. Within the guide may be disposed a sleeve 7 adapted for vertical reciprocation by means comprising a lever 8 associated with a gear wheel 9 which may be in mesh with a pinion 10 disposed in engagement with rack 11 integral with the sleeve 7. A spring 12 may normally maintain the sleeve 7 and the lever 8 in their upper positions, thus bringing a stop collar 13, fastened to the sleeve 7, in engagement with the lower end of the guide 6.

Within the sleeve 7 is disposed a plunger 14 adapted to be moved vertically and having a collar 15 at the upper end thereof to limit the downward movement of the plunger. At the lower end of the plunger may be provided a chuck 16 comprising a fixed jaw 17 and a removable jaw 18. A helical spring 19, disposed between the lower end of the sleeve 7, and the upper end of the chuck 16, acts to maintain the plunger in its relatively lower position with respect to the sleeve 7. The chuck, however, may normally be positioned above the work to be operated upon and may be moved downwardly by an actuation of the lever 8.

A heating element for heating the work, such as the coated wire prior to the welding operation, may consist of a rod 21 secured between the jaws 17 and 18 of the chuck. These jaws may be suitably insulated from each other by a non-conductive body, such as a mica plate 22, clamped between the jaws by a tap-bolt 23 which binds the jaws together to secure the resistance or heating element 21.

A suitable insulating sleeve 24 may be provided around a portion of the bolt 23 which extends through the jaw 18, and a non-conductive washer 25 may be provided to insulate the head of the bolt from the jaw. Other portions of the jaws may be suitably insulated or spaced from each other.

It will be evident that, if an electrical current is passed through the jaw 18, its path of travel will be through the resistance element 21, thence through the jaw 17, and such current may be provided to heat the rod 21 by reason of its resistance and, therefore, the jaw 18 is connected by a lead 26 to the secondary of a transformer 27, the jaw 17 being connected to the said secondary by a lead 28. Electrical energy may be conducted to the primary of the transformer 27 from any suitable source, as, for instance, the generator 29. Conductors 30, 31 and 32 may be provided for the passage of electrical current which may flow through the element 21 when the chuck 16 is in its upper position (as shown) by reason of a contact member 33 connected to the conductor 30 and a contact member 34 suitably positioned with respect to the movable sleeve 7 upon which the member 33 is carried.

The heating element having been brought to the proper temperature, it is then necessary to provide a suitable current for the welding operation. This is accomplished by the provision of a second transformer 35 from which electrical energy is transmitted through conductors 36 and 37. The conductor 36 may be connected to the jaw 17, and the conductor 37 may be connected to a work-supporting rack 38 which may be termed an electrode and upon which the base portion 39 of a lamp 41 may rest; the rack 38 being suitably insulated from other mechanism. Electrical energy may be received from the same source 29 through conductors 42, 43 and 44, conductor 42 being connected to a resilient contact member 45 carried on the sleeve 7, and the conductor 44 being connected to a suitably positioned contact member 46.

The contact member 46 is so disposed that, as the sleeve 7 is moved downwardly and the contact member 33 is disengaged from the member 34 to break the circuit of the transformer 27, a contact between the members 45 and 46 is effected. Thus, the heating element 21 may make contact with a leading-in wire 47 to heat the same, and as the circuit through the primary of transformer 35 is completed by contacts 45 and 46, a welding current may be caused to flow from heating element 21 across wire 47 to base 39, resulting in a welding operation.

In operation, a lamp 41 may be disposed in the rack and the leading-in wire 47 be positioned adjacent the edge of the shell or base 39, the movable electrode or chuck 16 being in its upper position. The contact members 33 and 34 being in engagement, as illustrated, the current may flow through the heating element and, by reason of its resistance, this element will reach a given temperature at which time the lever 8 may be operated and a downward movement of the chuck 16 be effected. As the chuck moves downwardly and the element 21 engages the leading-in wire 47, the circuit of the transformer 27 will be broken. By reason of the spring 19, the engagement between the element 21 and the leading-in wire 47 will be of a resilient nature and the lever may be operated to apply more or less pressure upon the leading-in wire, depending upon the amount of compression produced in the spring 19. Certain wires may require a more intimate contact with the heating element than others.

It will be understood that the contact members 45 and 46 may be so positioned as to cause a flow of current for the welding operation after a given amount of pressure has been exerted upon the leading-in wire by the heating element. By suitably spacing the contact members 33 and 34, the heating element may be engaged by the leading-in wire a greater or lesser time interval after the heating current through element 21 has ceased. After sufficient heat has been transferred to the wire to render the coating of the wire suitably non-resistant electrically, the members 45 and 46 may make contact to close the circuit of the primary 35 and effect a welding operation. When welding a wire having a coating, such as borax, the coating may serve as a flux to aid in a more effective union of the parts.

Although a preferred method and apparatus are described and a practical device is illustrated herewith, it is to be understood that modifications may be made therein. For instance, a single source of electrical current may be employed and means provided for inserting or removing suitable resistances or impedances to alternately heat the heating element and perform the welding operation. It is to be understood that such and other modifications are to be considered within the scope of the appended claims.

What is claimed is:

1. The method of electrically welding bodies having associated therewith an insulating material disposed in contact with the bodies and in the path of flow of a welding current through the bodies which comprises heat-treating the said bodies and material until the latter is conditioned to permit the passage of a welding current thru the bodies and in causing the flow of a welding current to effect a welding operation.

2. The method of electrically welding normally non-conductive bodies which comprises heat-treating the bodies in the absence of a welding current to condition them for the passage of a welding current and then passing a welding current thru the bodies to weld them together.

3. The method of electrically welding an insulated conductor to the base of a lamp which comprises heat-treating the conductor to condition the insulation to permit the passage of a welding current and then passing a welding current thru the conductor and base to weld them together.

4. The method of electrically welding a leading-in wire to the base of an incandescent electric lamp, said wire having an insulation thereon so disposed as to prevent a flow of welding current transverse to the axial line of the wire which comprises disposing a portion of the length of said wire adjacent to said base, heat-treating the wire to condition the same to permit a flow of welding current and then passing a welding current thru the wire and base to weld them together.

5. A device for electrically welding one body to another, at least one of said bodies having thereon a deposit of a non-conductive material which comprises means for supporting the bodies in adjacent relation, a pair of co-operating elements, means for heating at least one of said elements, means whereby said heated element may be maintained in contact with one of said bodies until heat conducted from said heated element conditions the non-conductive material to permit the passage of electrical energy thru said bodies and means for passing a welding current thru said elements and the bodies to be welded.

6. A device for electrically welding a conductor having a non-conductive coating thereon to a lamp base, comprising a supporting electrode for said base and a heating electrode normally removed from contact with the parts to be welded, means for raising the temperature of the heating electrode, means for maintaining contact between the heating electrode and the work until the coating permits the passage of electrical energy therethru and means for passing a welding current thru the work.

7. A device for welding a conductor having a non-conductive coating thereon to a lamp base comprising a pair of electrodes, one of which constitutes a support for the base, conductors connecting the other electrode in an electric heating circuit to heat the same, means for causing a relative movement between said heated electrode and the bodies to be welded to bring the work in position to be heated until the coating is conditioned for the passage of electrical energy and means for passing a welding current thru the electrodes and the bodies to be welded.

8. An electric welder comprising cooperating electrodes, means for heating at least one of said electrodes, means for moving said heated electrode in resilient contact with a body to be welded, means for increasing the pressure of said electrode upon said body and means for passing a welding current through said electrodes.

9. An electric welding device comprising a stationary electrode and a movable electrode, said stationary electrode having means for supporting a lamp base, said movable electrode comprising a plunger, means for normally holding said plunger in a given position, a resistance element secured to the lower end of said plunger, means for moving the plunger to bring said element in contact with a body to be welded, means for heating said element prior to its contact with said body and means for passing a welding current through said electrode when said element makes contact with said body.

In testimony whereof, I have hereunto subscribed my name this 18th day of January, 1923.

HARRY DE FOREST MADDEN.